(12) United States Patent
Matsubara et al.

(10) Patent No.: US 6,972,710 B2
(45) Date of Patent: Dec. 6, 2005

(54) AUTOMOTIVE RADIO WAVE RADAR AND SIGNAL PROCESSING

(75) Inventors: Shigeaki Matsubara, Chiyoda-ku (JP); Kazuaki Takano, Chiyoda-ku (JP); Hiroshi Kuroda, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/665,562

(22) Filed: Sep. 22, 2003

(65) Prior Publication Data
US 2004/0056793 A1 Mar. 25, 2004

(30) Foreign Application Priority Data
Sep. 20, 2002 (JP) .............................. 2002-275090

(51) Int. Cl.[7] .............................................. G01S 13/93
(52) U.S. Cl. .................... 342/70; 342/99; 342/100; 342/111; 342/112; 342/116; 342/129; 342/135; 342/196
(58) Field of Search ............... 342/70–72, 98–103, 342/111, 112, 116, 127–129, 135, 137, 139, 342/159, 192, 196

(56) References Cited

U.S. PATENT DOCUMENTS

| | | | | |
|---|---|---|---|---|
| 3,383,686 A | * | 5/1968 | Davis et al. ............... | 342/110 |
| 4,400,700 A | * | 8/1983 | Rittenbach ................. | 342/100 |
| 5,017,921 A | | 5/1991 | McGill et al. | |
| 5,280,288 A | | 1/1994 | Sherry et al. | |
| 5,757,307 A | * | 5/1998 | Nakatani et al. ........... | 342/70 |
| 5,828,333 A | * | 10/1998 | Richardson et al. ........ | 342/70 |
| 6,657,582 B2 | * | 12/2003 | Seki et al. .................. | 342/70 |
| 6,703,967 B1 | | 3/2004 | Kuroda et al. | |
| 6,859,705 B2 | * | 2/2005 | Rao et al. .................. | 701/45 |
| 6,864,831 B2 | * | 3/2005 | Woodington et al. ...... | 342/70 |
| 6,867,730 B2 | * | 3/2005 | Gottwald et al. .......... | 342/159 |
| 6,873,251 B2 | * | 3/2005 | Schiffmann et al. ....... | 340/436 |
| 2002/0180632 A1 | * | 12/2002 | Isaji ........................... | 342/70 |
| 2002/0190893 A1 | * | 12/2002 | Akasu ........................ | 342/70 |
| 2003/0193430 A1 | * | 10/2003 | Gresham et al. ........... | 342/70 |
| 2003/0210172 A1 | * | 11/2003 | Pleva et al. ................. | 342/70 |
| 2004/0056793 A1 | * | 3/2004 | Matsubara et al. ......... | 342/70 |

FOREIGN PATENT DOCUMENTS

| | | |
|---|---|---|
| FR | 2171961 | 9/1973 |
| JP | 07-043453 | 2/1995 |
| JP | 2932210 | 5/1999 |
| WO | WO 01/55745 A1 | 8/2001 |

OTHER PUBLICATIONS

"Multifunctional radar sensor for automotive application", Wollitzer, M.; Buechler, J.; Luy, J.-F.; Siart, U.; Schmidhammer, E.; Dellefsen, J.; Esslinger, M.;Microwave Theory and Techniques, IEEE Trans on, vol.: 46, Issue:5, May 1998 Ps:701-708.*

(Continued)

Primary Examiner—John B. Sotomayor
(74) Attorney, Agent, or Firm—Crowell & Moring LLP

(57) ABSTRACT

In an automotive radio wave radar, a center frequency of a transmitted wave is shifted at a certain cycle, and position information of an obstacle detected at three or more center frequencies is subjected to decision by majority to determine whether detection results of the obstacle are erroneous with the occurrence of jamming. If any of the detection results is determined to be abnormal, the abnormal result is discarded. An automotive radio wave radar is realized which can correctly perform the obstacle detection even in the event of jamming without causing erroneous obstacle detection or omission of the detection.

11 Claims, 11 Drawing Sheets

OTHER PUBLICATIONS

"Three-frequency principle for automotive radar system", Hui Zhang; Ke Wu, Radio and Wireless Conference, 2004 IEEE Sep. 19-22, 2004 Ps: 315-318.*

"Residual-carrier-free burst oscillator for automotive uwb radar applications", Teshirogi, T.; Saito, S.; Uchino, M.; Ejima, M.; Hamaguchi, K.; Ogawa, H.; Kohno, R., Electronics LettersVol 41, Issue 9, Apr. 28, 2005 Ps: 33-34.*

"Target distance and velocity measurement algorithm to reduce false targets in FMCW automotive radar", Misumoto-M; et al, IEICE-Transactions-on-Communications (Japan), vol. E83-B, No. 9, p. 1983-9, Sep. 2000. , Published: Inst. Electron. Inf. & Commun. Eng.*

"Multifunctional radar sensor for automotive application", Wollitzer-M; et al, IEEE-Transactions-on-Microwave-Theory-and-Techniques (USA), vol. 46, No. 5, pt.2, p. 701-8, May 1998, Published: IEEE.*

European Search Report Mailed Dec. 3, 2003.

* cited by examiner

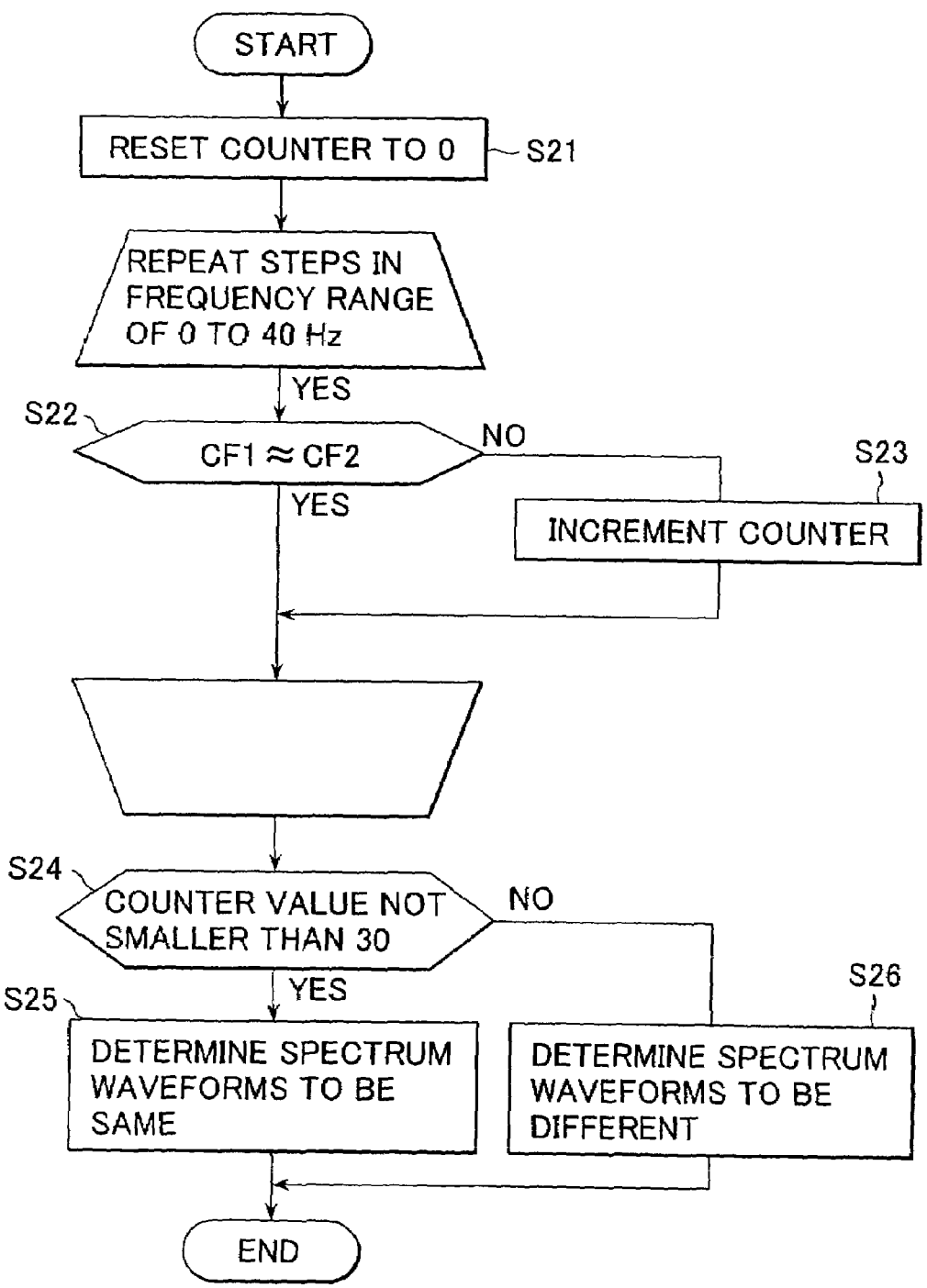

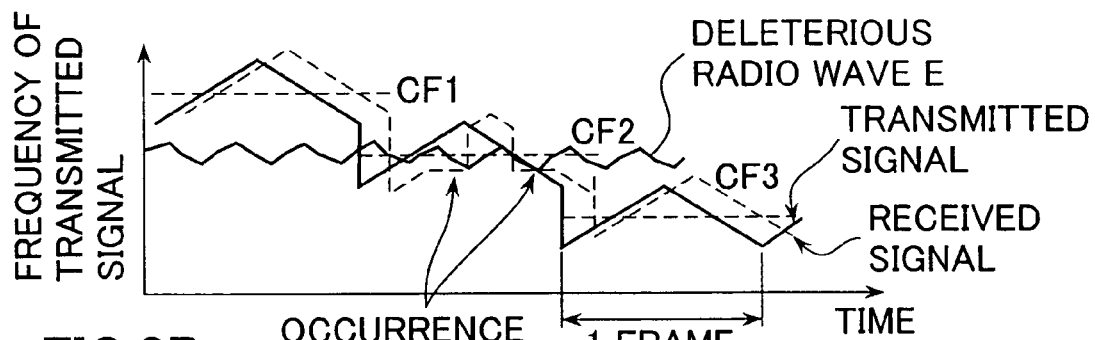
FIG.8A
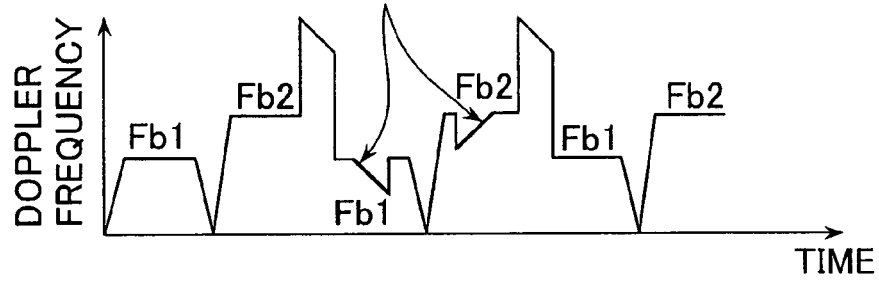
FIG.8B
FIG.9
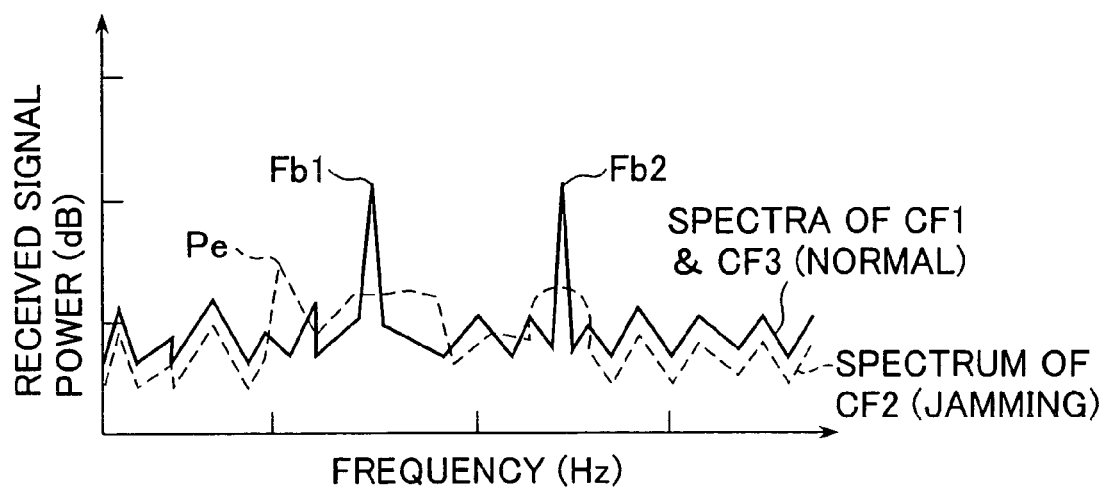

θ: DIRECTION OF VEHICLE RUNNING AHEAD

CHANGE OF RECEIVED SIGNAL INTENSITY
WITH MULTIPATH INTERFERENCE

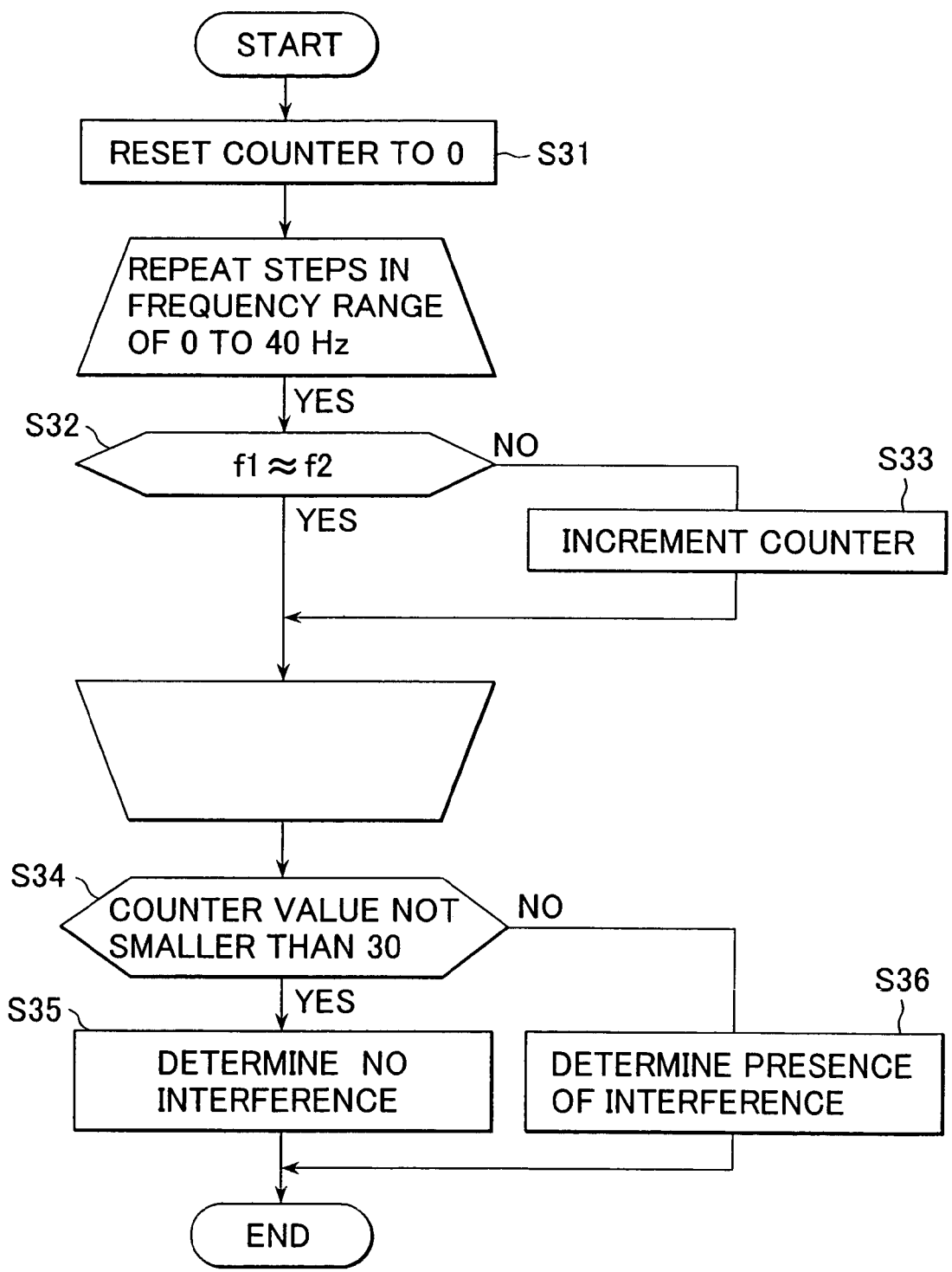

AUTOMOTIVE RADIO WAVE RADAR AND SIGNAL PROCESSING

BACKGROUND OF THE INVENTION

1. Field of the Invention

The present invention relates to an automotive radio wave radar and signal processing executed in the radar.

2. Description of the Related Art

Presently, a 76-GHz band is allocated as frequencies adapted for automotive radio wave radars used in vehicles, etc. In other words, automotive radio wave radars have the obligation to use a frequency range of 1 GHz from 76 GHz to 77 GHz.

When using automotive radio wave radars in vehicles, if another radio wave radar (e.g., a vehicle running in the opposite direction) employing exactly the same frequency as that employed by a radio wave radar mounted in a relevant vehicle is present within a radiation range of the relevant radar, there is a possibility that an interference occurs and the position of a vehicle running ahead cannot be accurately detected.

To avoid such a trouble, Japanese Unexamined Patent Application Publication No. 4-236388, for example, discloses a technique of superimposing an ID signal on a radar wave radiated from a radio wave radar, determining from the ID signal as a determination basis whether a received radar wave is one radiated from another vehicle and having the same frequency as that radiated from a relevant vehicle, and changing the frequency of the radar wave radiated from the relevant vehicle when the received radar wave is one radiated from another vehicle and having the same frequency as that radiated from the relevant vehicle, thereby preventing erroneous detection.

SUMMARY OF THE INVENTION

In the related art described above, however, it is required to add an ID signal oscillator for superimposing the ID signal on the radiated radar wave, and to provide an ID signal determining unit for determining whether the ID signal represents the relevant vehicle, after demodulation of the received signal. These requirements eventually result in an increase of the radar cost.

With the view of overcoming the problem set forth above, an object of the present invention is to provide an automotive radio wave radar and a signal processing method for use in the radar, which can prevent erroneous detection caused by jamming, including an interference, without requiring a special circuit and a determining unit and hence without increasing the cost.

To achieve the above object, the present invention provides an automotive radio wave radar in which a radio wave modulated about a certain frequency is radiated from a transmit antenna forward of a relevant vehicle, a reflected radio wave from a vehicle running ahead or other object is received by a receive antenna, and at least a position of the vehicle running ahead relative to the relevant vehicle is computed, the radar comprising an oscillation unit for oscillating a radio wave to be transmitted while changing a center frequency of the transmitted radio wave to different frequencies at a certain time interval; and a signal processing unit for computing position information of the vehicle running ahead for each of the center frequencies of the radio waves transmitted from the oscillation unit. The signal processing unit executes decision by majority on the position information computed for at least three or more center frequencies, and when mismatching position information is computed with the occurrence of any jamming, determines the position information, which has been decided to be minority with the decision by majority, to be an abnormal value and discards the abnormal value.

With the automotive radio wave radar of the present invention having the above features, results of the position information computed for at least three or more center frequencies are subjected to decision by majority. If a mismatching result of the position information is computed on account of an interference with a radio wave transmitted from a radar equipped in another vehicle, the mismatching result is determined to be an abnormal value with the decision by majority and then discarded. It is hence possible to prevent erroneous detection of an obstacle otherwise caused by the interference.

Also, the present invention provides an automotive radio wave radar in which a radio wave modulated about a certain frequency is radiated from a transmit antenna forward of a relevant vehicle, a reflected radio wave from a vehicle running ahead or other object is received by a receive antenna, and at least a position of the vehicle running ahead relative to the relevant vehicle is computed, the radar comprising an oscillation unit for oscillating a radio wave to be transmitted while changing a center frequency of the transmitted radio wave to different frequencies at a certain time interval; and a signal processing unit for computing spectra from intermediate frequency signals resulting from down-converting received reflected radio waves of at least three or more center frequencies by a mixer, and when a part or the whole of at least one of the computed spectra is determined to have a different waveform with the occurrence of any jamming, determining the at least one spectrum to be abnormal, and discarding the abnormal spectrum.

With the automotive radio wave radar of the present invention having the above features, the determination as to the erroneous detection can be performed by comparing spectrum waveforms of the intermediate frequency (IF) signals which are obtained by down-converting the received reflected radio waves.

The automotive radio wave radar of the present invention is applicable to any of a 2-frequency CW (Continuous Wave) radar in which radio waves of two different frequencies are alternately radiated forward of the relevant vehicle, reflected radio waves from the vehicle running ahead are received by the receive antenna, and information of a range relative to the vehicle running ahead is computed from a phase difference between the received radio waves of the two frequencies, and an FMCW (Frequency Modulated Continuous Wave) radar for transmitting a radio wave while performing frequency modulation to change a frequency of the transmitted radio wave in a predetermined pattern with time.

Further, the present invention provides an automotive radio wave radar of the 2-frequency CW type in which radio waves of two different frequencies are alternately radiated forward of a relevant vehicle, reflected radio waves from a vehicle running ahead are received by a receive antenna, and information of a range relative to the vehicle running ahead is computed from a phase difference between the received radio waves of the two frequencies, wherein the radar includes a signal processing unit for computing spectra of the radio waves of the two frequencies received by the radar, and when a part or the whole of at least one of the computed spectra is determined to have a different waveform with the occurrence of any jamming, determining the at least one spectrum to be abnormal.

With the automotive radio wave radar of the present invention having the above features, the determination as to the erroneous detection can be performed by comparing the spectra of the received radio waves of two frequencies.

The automotive radio wave radar of the present invention further comprises a unit for informing a driver of the fact that obstacle detection by the radar is disabled, when an interference occurs for plural center frequencies and received signals are all determined to be abnormal. A display unit for providing visual display and/or a speaker for issuing a voice output can be used to prompt the driver to pay attention.

In addition, to achieve the above object, the present invention provides a signal processing method for use in an automotive radio wave radar, comprising the steps of radiating a radio wave modulated about a certain center frequency from a transmit antenna forward of a relevant vehicle, receiving a reflected radio wave from a vehicle running ahead or other object by a receive antenna, and detecting at least a position of the vehicle running ahead relative to the relevant vehicle, wherein the method further comprises the steps of oscillating a radio wave to be transmitted while changing a center frequency of the transmitted radio wave to different frequencies at a certain time interval; computing position information of the vehicle running ahead for each of the center frequencies of the transmitted radio waves; executing decision by majority on the position information computed for at least three or more center frequencies; and when mismatching position information is computed with the occurrence of any jamming, determining the position information, which has been decided to be minority with the decision by majority, to be an abnormal value and discarding the abnormal value.

Also, the present invention provides a signal processing method for use in an automotive radio wave radar, comprising the steps of radiating a radio wave modulated about a certain center frequency from a transmit antenna forward of a relevant vehicle, receiving a reflected radio wave from a vehicle running ahead or other object by a receive antenna, and detecting at least a position of the vehicle running ahead relative to the relevant vehicle, wherein the method further comprises the steps of oscillating a radio wave to be transmitted while changing a center frequency of the transmitted radio wave to different frequencies at a certain time interval; computing spectra from intermediate frequency signals resulting from down-converting received reflected radio waves by a mixer; and when a part or the whole of at least one of the computed spectra is determined to have a different waveform with the occurrence of any jamming, determining the at least one spectrum to be abnormal and discarding the abnormal spectrum.

Further, the present invention provides a signal processing method for use in an automotive radio wave radar of the 2-frequency CW type, the method comprising the steps of alternately radiating radio waves of two different frequencies forward of a relevant vehicle; receiving reflected radio waves from the vehicle running ahead by a receive antenna; and computing information of a range relative to the vehicle running ahead from a phase difference between the received radio waves of the two frequencies, wherein the method further comprises the steps of computing spectra of the radio waves of the two frequencies received by the radar; and when a part or the whole of at least one of the computed spectra is determined to have a different waveform with the occurrence of any jamming, determining the at least one spectrum to be abnormal.

BRIEF DESCRIPTION OF THE DRAWINGS

FIG. 7 is a flowchart of a spectrum waveform comparison logic according to the one embodiment of the present invention;

FIG. 8A is a waveform chart showing a pattern of the transmitted signal resulting when a center frequency is shifted at a constant cycle in an FMCW (Frequency Modulated Continuous Wave) radar, and FIG. 8B is a chart showing a Doppler frequency characteristic;

FIG. 9 is a waveform chart showing a spectrum waveform resulting from down-converting the received signal when jamming has occurred;

FIG. 15 is a flowchart of a spectrum waveform comparison logic in the 2-frequency CW radar.

DESCRIPTION OF THE PREFERRED EMBODIMENTS

An embodiment of an automotive radio wave radar according to the present invention will be described below with reference to the drawings.

Figure 1:
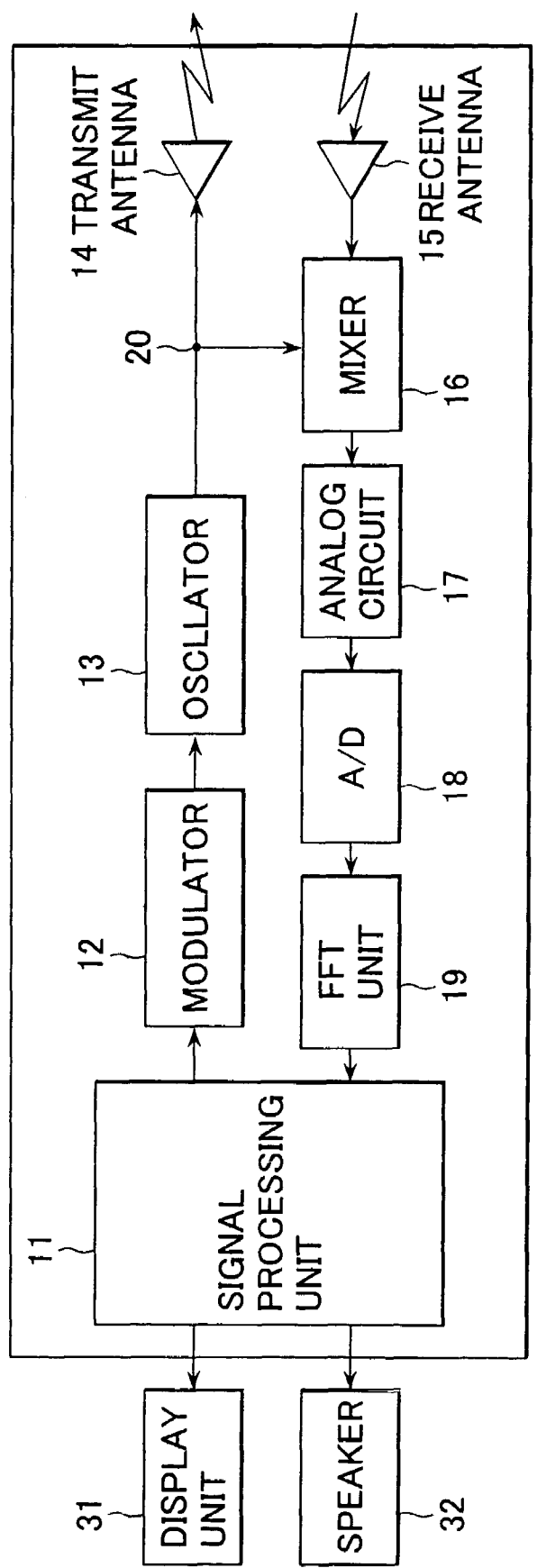
FIG. 1 is a block diagram showing one embodiment of an automotive radio wave radar according to the present invention.

FIG. 1 shows one embodiment of the automotive radio wave radar according to the present invention. The automotive radio wave radar comprises a signal processing unit 11, a modulator 12, an oscillator 13, a transmit antenna 14, a receive antenna 15, a mixer 16, an analog circuit 17, an A/D converter 18, and an FFT (Fast Fourier Transform) unit 19.

The oscillator 13 receives a modulated signal from the modulator 12 and radiates a modulated high-frequency signal (radio wave) from the transmit antenna 14. The oscillator 13 oscillates a millimeter wave in a 76-GHz band as the high-frequency signal. Also, the oscillator 13 is capable of oscillating the millimeter wave while changing the center frequency of the transmitted radio wave to different frequencies at a certain time interval. In this embodiment, the oscillator 13 repetitively oscillates radio waves having three ore more center frequencies (CF1, CF2, CF3, . . . ) different from each other.

A radio wave signal returned after being reflected by a target, such as another vehicle or an obstacle, is received by the receive antenna 15 and then subjected to frequency conversion in the mixer 16. A part of the output signal from the oscillator 13 is supplied to the mixer 16 through a directional coupler 20, and a beat signal generated with mixing of the output signal from the oscillator 13 and the received signal is sent to the analog circuit 17. The analog circuit 17 measures a rate (relative speed) and a range with respect to another vehicle by utilizing a Doppler frequency. In the case of a homodyne receiving system in which the received signal is directly converted to a base band, the frequency of the beat signal outputted from the mixer 16 provides the Doppler frequency.

The beat signal sent to the analog circuit 17 is converted to a digital signal by the A/D converter 18, and then supplied to the FFT unit 19. Based on a frequency spectrum of the beat signal, the FFT unit 19 measures information of amplitude and phase through Fourier analysis processing. The information of amplitude and phase is sent to the signal processing unit 11.

Figure 2A:
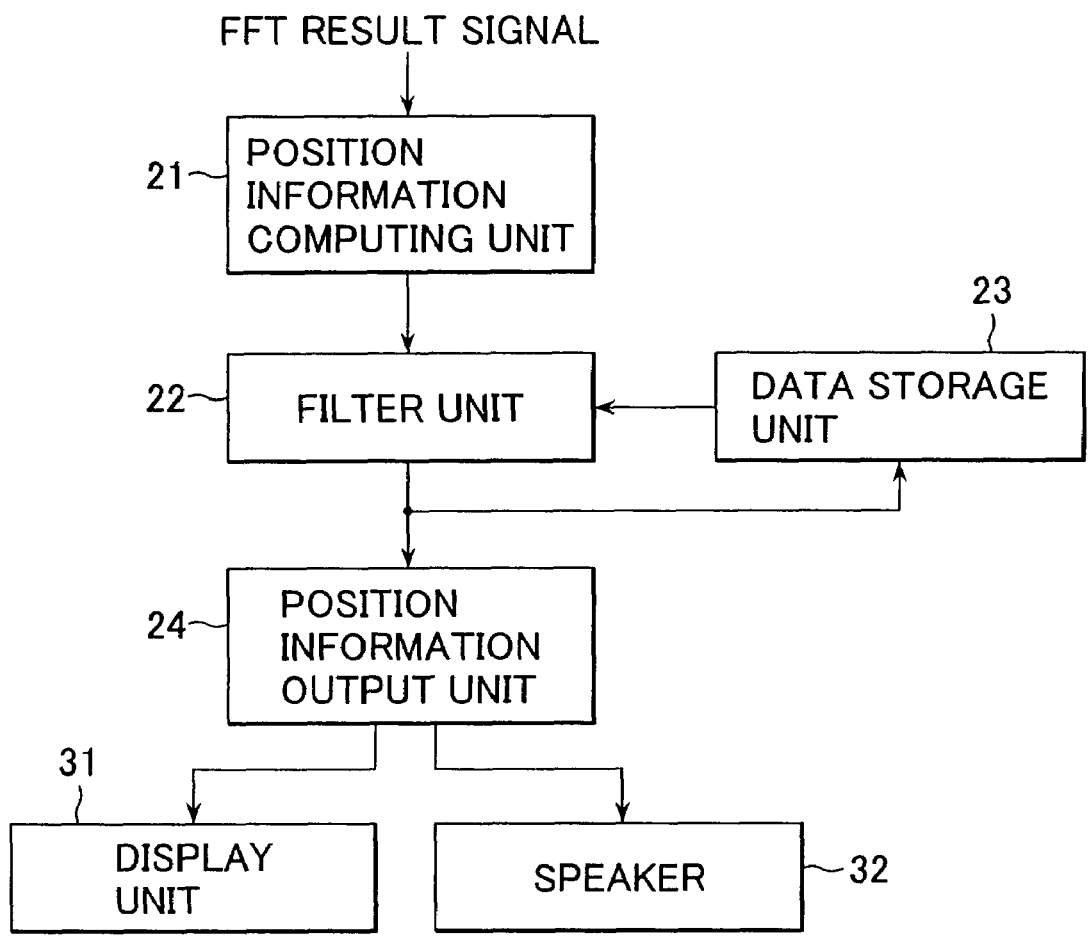
FIG. 2A is a block diagram showing one example of a signal processing unit of the automotive radio wave radar according to the present invention.

The signal processing unit 11 is constituted by, e.g., a DSP (Digital Signal Processor) and includes, as shown in FIG. 2A, a position information computing unit 21, a filter unit 22, a data storage unit 23, and a position information output unit 24.

The position information computing unit 21 computes position information (range, rate, and azimuth) of a vehicle running ahead at each center frequency (CF1, CF2, CF3, . . . ) based on the FFT analysis result for each of the center frequencies (CF1, CF2, CF3, . . . ). The filter unit 22 executes decision by majority on the position information obtained from the radar waves at three center frequencies (CF1, CF2, CF3). The position information, which has been decided to be minority with the decision by majority in the filter unit 22, is determined as an abnormal value and discarded. Values of the remaining true data (normal data) are averaged and stored in the data storage unit 23, and are also outputted to a display unit 31, e.g., a liquid crystal display shown in FIG. 2B, and to a speaker 32 from the position information output unit 24.

Figure 3:
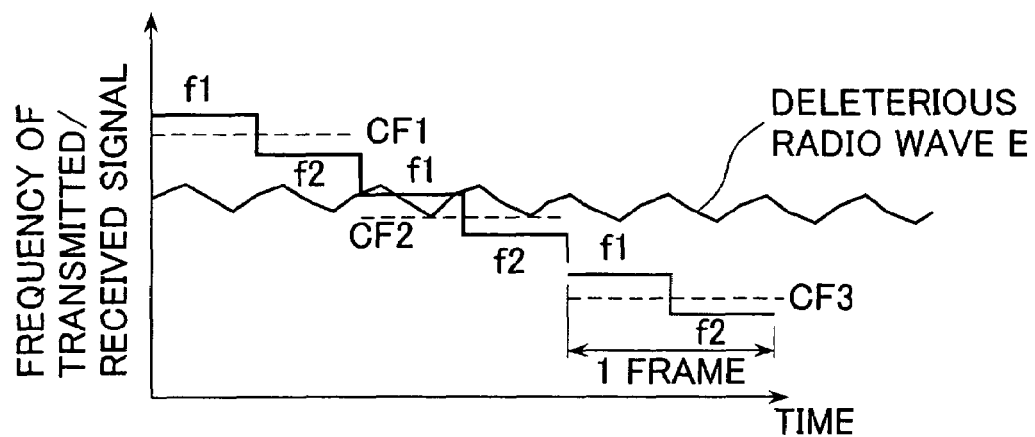
FIG. 3 is a chart showing a radiation pattern of a transmitted signal resulting when a center frequency is shifted at a constant cycle in a 2-frequency CW (continuous wave) radar.

FIG. 3 shows one example of a transmitted signal in the automotive radio wave radar according to the present invention. In a 2-frequency CW (continuous wave) radar which radiates radio waves modulated to have two frequencies f1 and f2 for each center frequency set to the middle between the two frequencies and which measures the range up to an obstacle from a phase difference between the two radio waves received after being reflected by the obstacle, the transmitted signal is obtained by shifting the center frequency CF (f1, f2) at a certain cycle.

The shift of the center frequency and the modulation to respective two frequencies are carried out by the modulator 12 under control of the signal processing unit 11. The signal processing is made on the transmitted signal with the two frequencies f1, f2 set as one frame, and the center frequency is shifted to CF1, CF2, CF3, . . . in units of several frames.

Figure 4:
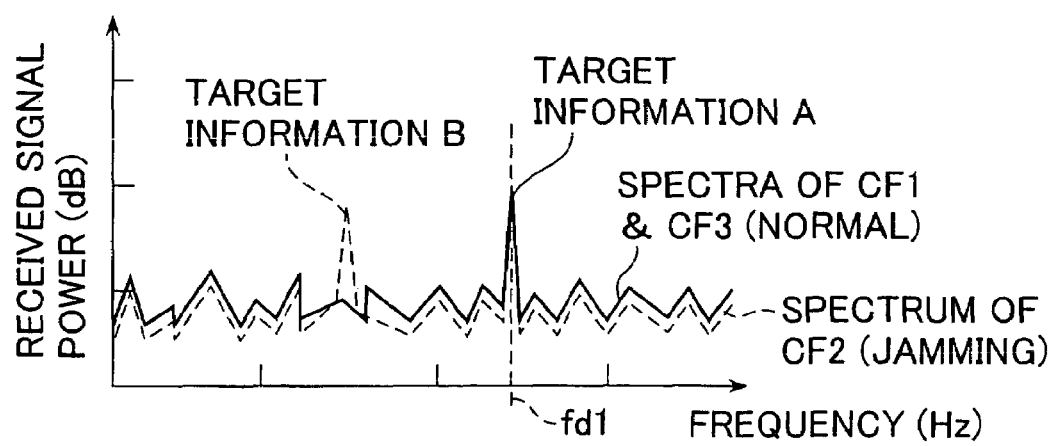
FIG. 4 is a waveform chart showing one example of a spectrum waveform resulting from down-converting a received signal when the transmitted signal undergoes jamming.

FIG. 4 shows one example of a spectrum waveform resulting from executing the FFT (Fast Fourier Transform) on the beat signal obtained from the mixer 16. When a transmitted wave f1 at the center frequency CF1 is reflected by the vehicle running ahead and received by the radar, the rate of the vehicle running ahead relative to a relevant vehicle is obtained as a Doppler frequency fd1 indicated by a peak (target information) A.

A formula for determining the rate (Rate) of the vehicle running ahead from the Doppler frequency fd1 is defined as given below:

$$\text{Rate} = C(fd1/2f1)$$

where C: the velocity of light

By determining a phase difference $\phi$ between peaks of the transmitted waves f1 and f2, the range (Range) relative to the vehicle running ahead is calculated as follows:

$$\text{Range} = C \cdot \phi / 4\pi \cdot \Delta f$$

$$\Delta f = f1 - f2$$

The above-mentioned method for computing the position information of the vehicle running ahead does not depend on the shift of the center frequency (CF1, CF2, CF3, . . . ) so long as the frequency width between f1 and f2 is not changed.

Figure 5:
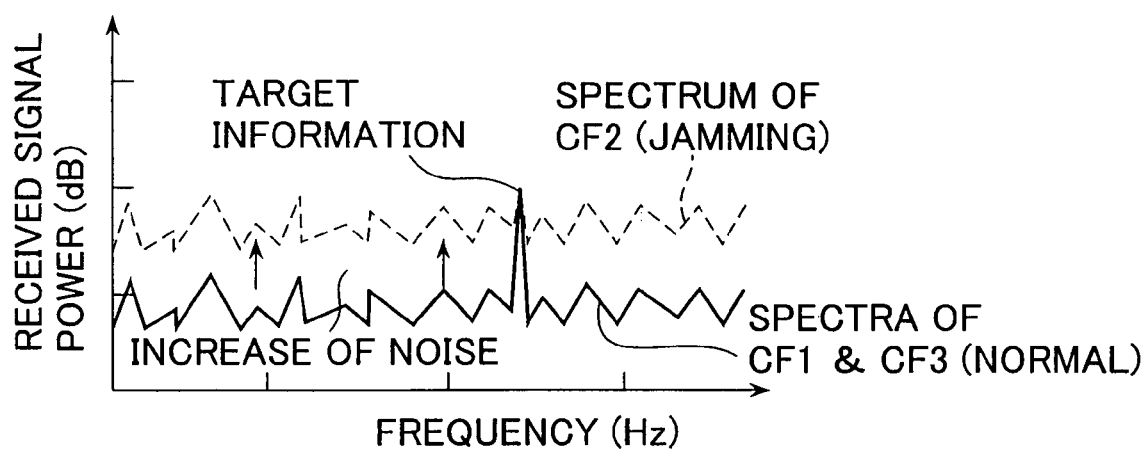
FIG. 5 is a waveform diagram showing one example of a spectrum waveform resulting from down-converting a received signal when the transmitted signal undergoes jamming.

If the transmitted frequency f1 at CF2 is subjected to jamming by a deleterious wave E as shown in FIG. 8, there is a possibility that an erroneous peak (target information) B is detected as seen from the spectrum shown in FIG. 4, or that noise increases as seen from the spectrum shown in FIG. 5. This may result in that the erroneous position information of the vehicle running ahead is outputted.

To avoid such a trouble, decision by majority is carried out using results obtained from processing of the signals at three or more center frequencies (CF1, CF2, CF3, . . . ). When it is determined that the signal processing results differ from each other, at least one of the signal processing results, which has been decided to be minority with the decision by majority, is determined as an abnormal value and discarded. It is therefore possible to suppress the output of the erroneous position information of the vehicle running ahead.

Figure 6:
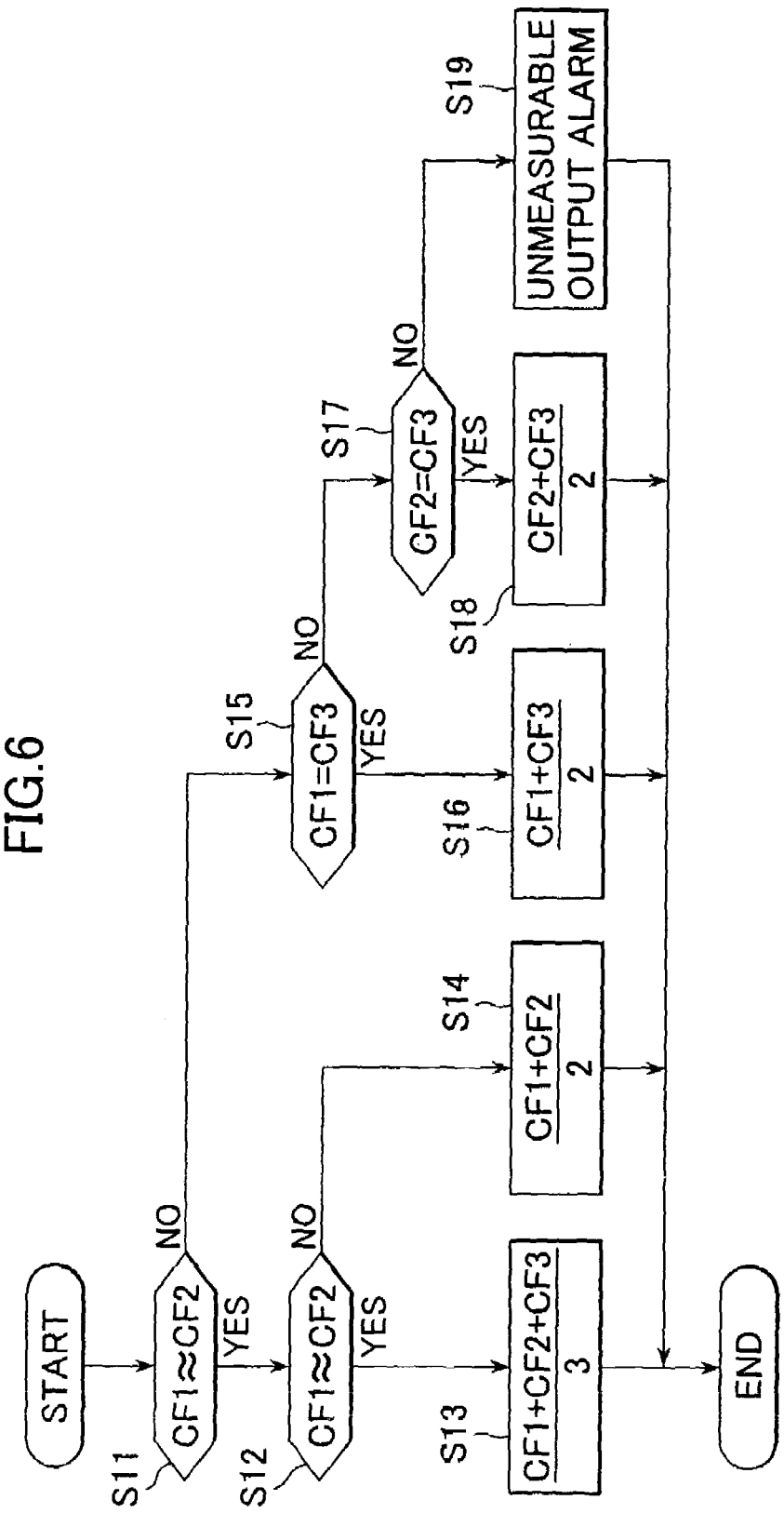
FIG. 6 is a flowchart of a decision-by-majority logic and a logic for obtaining true data with decision by majority according to the one embodiment of the present invention.

Control flows of such a decision-by-majority logic and a logic for obtaining true data with decision by majority will be described below with reference to FIG. 6.

First, it is determined whether a difference (deviation) between the position information (e.g., range value) computed from the signal at the center frequency CF1 and the position information computed from the signal at the center frequency CF2 is within a preset threshold (step S11).

If the difference is within the threshold (YES in step S11), it is then determined whether a difference (deviation) between the position information computed from the signal at the center frequency CF2 and the position information computed from the signal at the center frequency CF3 is within a preset threshold (step S12).

If the difference is within the threshold (YES in step S12), this means that no jamming occurs. In this case, all data of the position information computed from the signal at the center frequency CF1, the position information computed from the signal at the center frequency CF2, and the position information computed from the signal at the center frequency CF3 are regarded as true data and used to compute an average value of those data (step S13).

On the other hand, if the difference between the position information computed from the signal at the center frequency CF2 and the position information computed from the signal at the center frequency CF3 is not within the threshold (NO in step S12), this means that jamming occurs at the center frequency CF3. In this case, data of the position information computed from the signal at the center frequency CF1 and the position information computed from the signal at the center frequency CF2 are regarded as true data and used to compute an average value of those data (step S14).

The difference between the position information computed from the signal at the center frequency CF1 and the position information computed from the signal at the center frequency CF2 is not within the threshold (NO in step S11), it is then determined whether a difference (deviation) between the position information computed from the signal at the center frequency CF1 and the position information computed from the signal at the center frequency CF3 is within a preset threshold (step S15).

If the difference is within the threshold (YES in step S15), this means that jamming occurs at the center frequency CF2. In this case, data of the position information computed from the signal at the center frequency CF1 and the position information computed from the signal at the center frequency CF3 are regarded as true data and used to compute an average value of those data (step S16).

The difference between the position information computed from the signal at the center frequency CF1 and the position information computed from the signal at the center frequency CF3 is not within the threshold (NO in step S15), it is then determined whether a difference (deviation) between the position information computed from the signal at the center frequency CF2 and the position information computed from the signal at the center frequency CF3 is within a preset threshold (step S17).

If the difference is within the threshold (YES in step S17), this means that jamming occurs at the center frequency CF1. In this case, data of the position information computed from the signal at the center frequency CF2 and the position information computed from the signal at the center frequency CF3 are regarded as true data and used to compute an average value of those data (step S18).

Figure 2B:
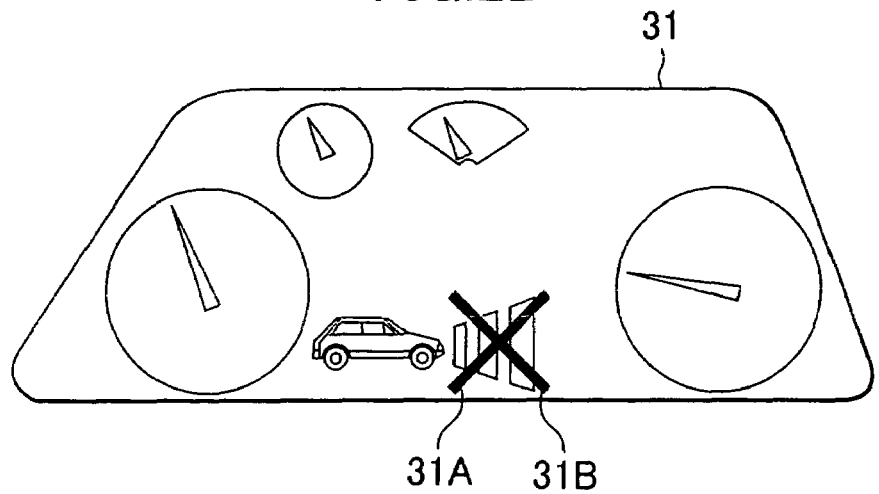
FIG. 2B is an explanatory view showing one example of a display unit.

The difference between the position information computed from the signal at the center frequency CF2 and the position information computed from the signal at the center frequency CF3 is not within the preset threshold (NO in step S17), this means that any true data not subjected to jamming cannot be extracted. In this case, an alarm is issued (step S19). Thus, the fact that the radar detection is unable to perform (i.e., the measurement is disabled) is informed to a driver by visual display on the display unit (instrument panel) 31 and/or a voice output with the speaker 32. The driver is thereby prompted to pay attention. The display on the display unit 31 in the event of jamming is performed, for example, by indicating a mark x 31B in a radar display area 31A as shown in FIG. 2B.

As a modification, a spectrum may be computed from an intermediate frequency (IF) signal resulting from down-converting the received reflected wave by the mixer 16. In this case, if it is determined that a part or the whole of the computed spectrum has a different waveform with the occurrence of jamming, the spectrum is determined to be abnormal and discarded. Then, an average value of true data can be obtained in accordance with a control flow similar to that of the logic for obtaining true data based on decision by majority shown in FIG. 6.

A control flow of a logic for comparing spectrum waveforms will be described below with reference to FIG. 7.

First, a counter is reset to 0 (step S21). Then, it is determined whether a difference in signal intensity between the spectrum at the center frequency CF1 and the spectrum at the center frequency CF2 for each frequency (e.g., a sampling frequency per 1 Hz) over a predetermined frequency range (0 to 40 Hz) is within a preset threshold (step S22). If the difference is within the threshold, the counter is incremented (step S23). Both the determining step S22 and the counter incrementing step S23 are repeated over the frequency range 0 to 40 Hz.

If both the determining step S22 and the counter incrementing step S23 are completed, it is determined whether the counter value is not smaller than a predetermined value, e.g., 30 (step S24). If the counter value is not smaller than 30 (YES in step S24), the spectrum waveforms are determined to be the same (step S25). On the other hand, if the counter value is smaller than 30 (NO in step S24), the spectrum waveforms are determined to be different from each other (step S26).

The above-mentioned comparison of the spectrum waveforms is also performed in a similar manner for the waveforms of the spectrum at the center frequency CF1 and the spectrum at the center frequency CF3 and the waveforms of the spectrum at the center frequency CF2 and the spectrum at the center frequency CF3.

Next, another embodiment in which the present invention is applied to an FMCW (Frequency Modulated Continuous Wave) radar will be described below with reference to FIGS. 8A and 8B. FIG. 8A shows a modulation pattern in the FMCW radar, and FIG. 8B shows Doppler frequency resulting from down-converting the transmitted wave and the received wave in the mixer.

The FMCW radar differs from the 2-frequency CW radar in that, as shown in FIG. 8A, the frequency modulation is changed linearly with time (i.e., triangular modulation).

In the FMCW radar, the signal processing is performed with a rise zone and a fall zone of a triangular wave set as one frame, and the center frequency is shifted to CF1, CF2, CF3, . . . in units of several frames.

With such a modulation method, between the transmitted signal and the received signal, there occurs a Doppler shift depending on both a time delay corresponding to the range up to the vehicle running ahead, through which the radio wave reciprocates, and the rate of the relevant vehicle relative to the vehicle running ahead. A resulting frequency difference (Doppler frequency) is given as Fb1 in the rise zone and Fb2 in the fall zone of the triangular wave.

By executing the FFT (Fast Fourier Transform) on the Doppler signal thus obtained, as shown FIG. 9, a target, e.g., the vehicle running ahead, can be extracted as a signal peak in the frequency range. The frequencies Fb1, Fb2 at which peaks representing the target appear are in proportion to the range up to the target. Specifically, a frequency 0 indicates that the range is 0.

If jamming by a deleterious wave E occurs near the transmission frequency of CF2, there is a possibility that a peak Pe is detected at an erroneous frequency, or a correct peak cannot be obtained. This may result in that the erroneous position information of the vehicle running ahead is outputted.

To avoid such a trouble, decision by majority is carried out using results obtained from processing of the signals at three or more center frequencies. When it is determined that the signal processing results differ from each other, at least one of the signal processing results, which has been decided to be minority with the decision by majority, is determined as an abnormal value and discarded. It is therefore possible to suppress the output of the erroneous position information of the vehicle running ahead as with the 2-frequency CW radar described above.

Figure 10B:
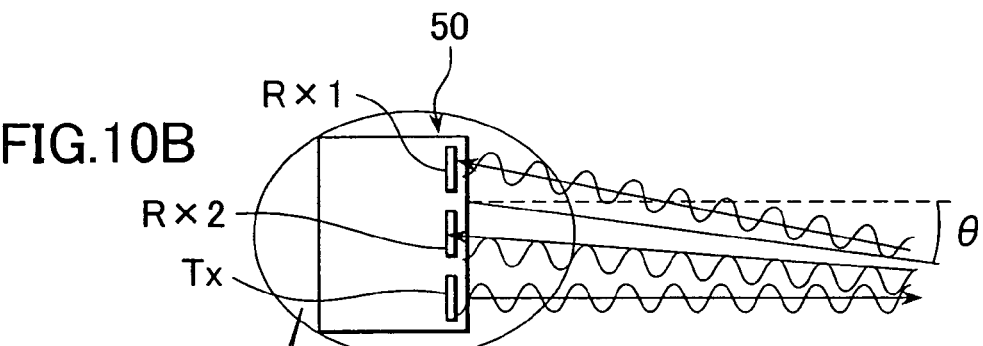
FIG. 10B shows the mono-pulse radar.
Figure 10A:
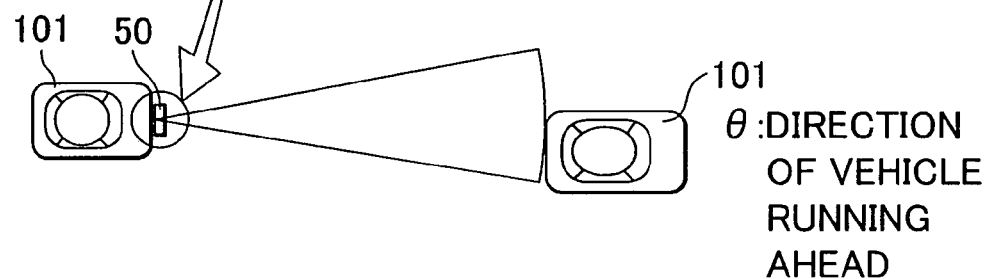
FIG. 10A is an illustration for explaining means for measuring the azimuth of a vehicle running ahead by a mono-pulse radar.
Figure 11:
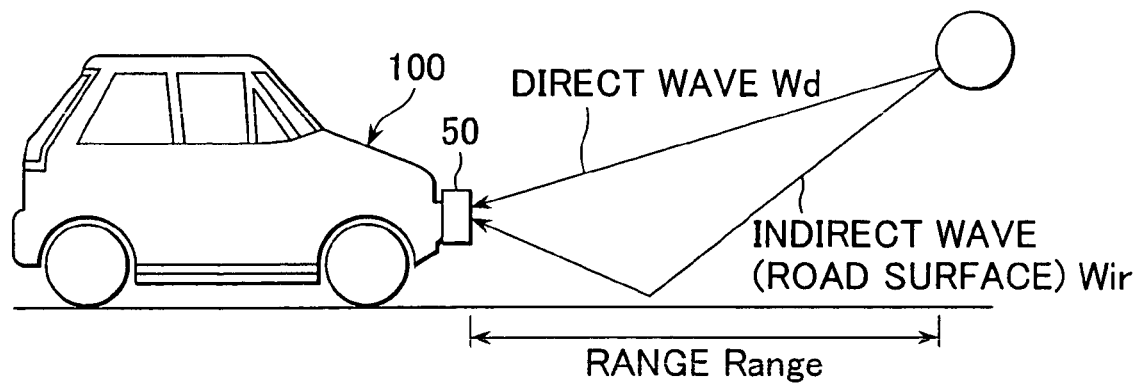
FIG. 11 is an illustration showing radio wave paths when a reflected wave from an obstacle is received through plural paths.
Figure 12:
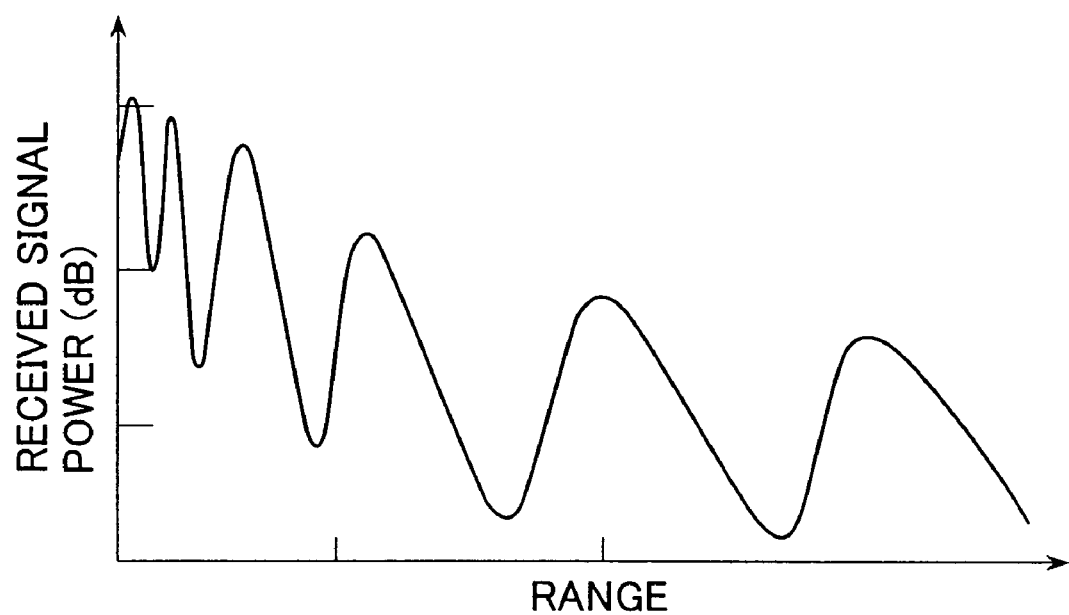
FIG. 12 is a graph showing change of received signal power versus range up to the obstacle depending on an interference of reflected waves received through two paths.

Next, still another embodiment in which the present invention is applied to a mono-pulse radar will be described below with reference to FIGS. 10 to 12. FIG. 10A is an illustration showing a situation from above in which a relevant vehicle 100 equipped with a radio wave radar 50 is running following a vehicle 101 running ahead. In the mono-pulse radar, as shown in FIG. 10B, two receive antennas Rx1, Rx2 are provided for one transmit antenna Tx. The azimuth of the vehicle running ahead is measured from a ratio between signal intensities of two reflected waves received by the receive antennas Rx1, Rx2.

Generally, in an automotive radio wave radar, because a radio wave is reflected by a road surface and a sidewall present in the radiation range, there are a direct wave received through the shortest path from the vehicle 101 running ahead, and an indirect wave received after being reflected by the road surface and the sidewall. As shown in FIG. 11, a reflected wave received from a reflecting object X present at a certain range (Range) includes not only a direct wave Wd, but also an indirect wave Wir received after being reflected by the road surface. A resultant received signal of the direct wave Wd and the indirect wave Win attenuates depending on the difference in path length (= phase difference) between both the waves.

The path length difference (=phase difference) depends on, in addition to change of the range up to the reflecting object, the height of the reflecting object and the frequency of the transmitted radio wave. FIG. 12 shows a distribution of the amount of attenuation with respect to the range up to the reflecting object at a certain height resulting when the transmitted wave of a certain frequency is employed. The indirect wave received after being reflected by the sidewall also attenuates due to an interference with the indirect wave received after being reflected by the road surface and has a specific attenuation distribution.

Figure 13:
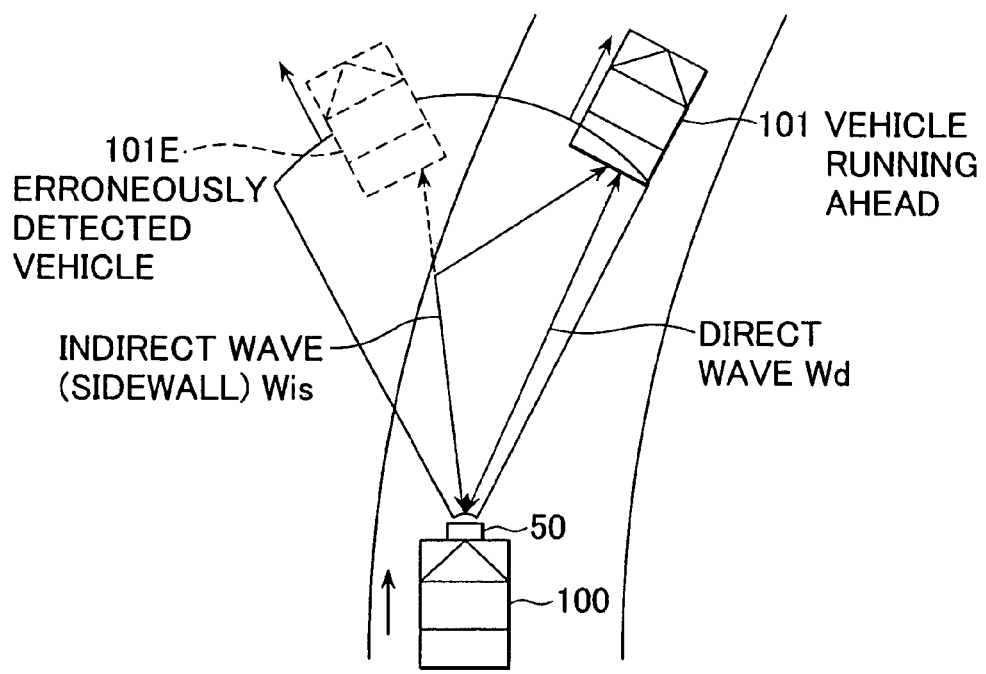
FIG. 13 is an illustration showing a travel pattern resulting when the position of the vehicle running ahead is erroneously detected on account of multiple reflection.

As shown in FIG. 13, when the relevant vehicle 100 equipped with the radio wave radar 50 is running following the vehicle 101 running ahead, an indirect wave Wis received after being reflected by the sidewall, etc. and the indirect wave received after being reflected by the road surface are received in addition to the direct wave Wd from the vehicle 101 running ahead.

Usually, the indirect wave Wis received from the sidewall attenuates with the reflection by the sidewall and hence hardly has reception intensity stronger than that of the direct wave Wd. In most cases, therefore, correct measurement is performed based on the direct wave Wd when the azimuth of the vehicle running ahead is measured by the mono-pulse radar.

Depending on the range, however, the received signal of the direct wave Wd attenuates in larger amount than that of the indirect wave Wis from the sidewall, thus resulting in that the azimuth of the vehicle running ahead may be erroneously measured as indicated by a vehicle 101E. To avoid such a trouble, in this embodiment, the azimuth is measured at three ore more center frequencies different from each other, and measured values are subjected to decision by majority. Accordingly, even when, although in a very few cases, the direct wave attenuates in larger amount at a certain frequency, a different signal processing result from the other results can be determined as an abnormal value with the decision by majority and discarded.

Next, as still another embodiment, an application of the present invention to a 2-frequency CW radar will be described below with reference to FIG. 14. The 2-frequency CW radar employs, as described above, the modulation method of radiating radio waves of two frequencies f1 and f2 with the center frequency set to the middle between those two frequencies.

Figure 14:
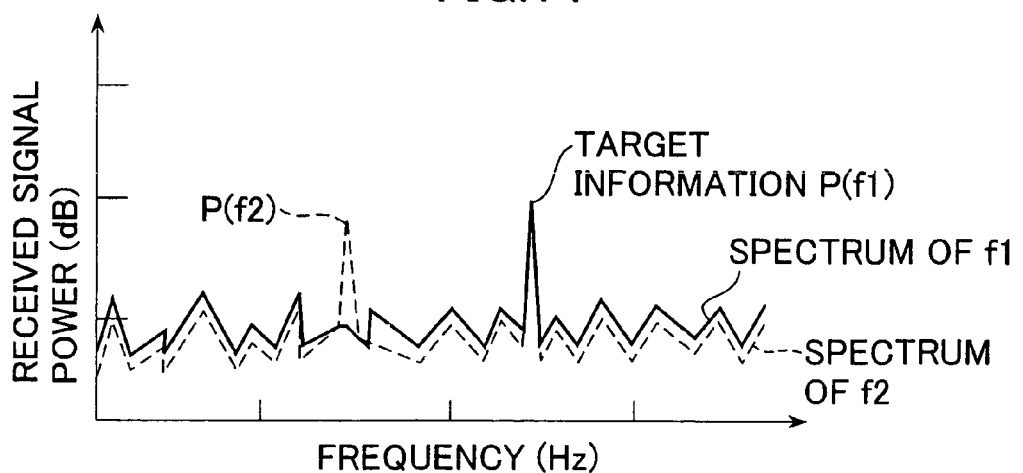
FIG. 14 is a waveform chart showing spectrum waveforms when different received signals are produced with the occurrence of jamming between two frequencies f1 and f2 of the 2-frequency CW radar.

If jamming by a deleterious wave occurs at any of the two transmission frequencies, e.g., at the frequency f2, a difference in waveform is caused in a part or the whole of a spectrum obtained with the frequency f1 and a spectrum obtained with the frequency f2 as seen from the spectra shown in FIG. 14. In this case, a peak frequency representing target information appears at different values P(f1) and P(f2) for the spectrum obtained with the frequency f1 and the spectrum obtained with the frequency f2.

Thus, a fail signal can be outputted by comparing the spectrum waveforms of f1 and f2 and then determining the presence of an abnormality if the spectrum waveforms are determined to be different from each other.

A control flow of a logic for comparing spectrum waveforms in such a case will be described below with reference to FIG. 15. First, a counter is reset to 0 (step S31). Then, it is determined whether a difference in signal intensity between the spectrum obtained with the frequency f1 and the spectrum obtained with the frequency f2 for each frequency (e.g., a sampling frequency per 1 Hz) over a predetermined frequency range (0 to 40 Hz) is within a preset threshold (step S32).

If the difference is within the threshold, the counter is incremented (step S33). Both the determining step S32 and the counter incrementing step S33 are repeated over the frequency range 0 to 40 Hz.

If both the determining step S32 and the counter incrementing step S33 are completed, it is determined whether the counter value is not smaller than a predetermined value, e.g., 30 (step S34). If the counter value is not smaller than 30 (YES in step S34), no interference is determined (step S35). On the other hand, if the counter value is smaller than 30 (NO in step S34), the presence of interference is determined (step S36).

With the embodiments of the present invention, as described above, the automotive radio wave radar includes an oscillation unit for oscillating a radio wave to be transmitted forward of a relevant vehicle while changing a center frequency of the radio wave to different frequencies at a certain time interval. Position information of a vehicle running ahead is calculated for each of plural center frequencies of the radio waves transmitted from the oscillation unit. Results of the position information computed for at least three or more center frequencies are subjected to decision by majority. If a mismatching result of the position information is computed on account of an interference with a radio wave transmitted from a radar equipped in another vehicle, the mismatching result is determined to be an abnormal value with the decision by majority and then discarded. It is hence possible to prevent erroneous detection of an obstacle otherwise caused by the interference.

Such an advantage can be obtained not only in the case of using the position information as data for determination based on the decision by majority, but also in the case of comparing spectrum waveforms of IF signals resulting from down-converting received reflected waves, and determining erroneous detection from comparison results.

Also, erroneous detection is caused by, in addition to an interference with a radar wave transmitted from another vehicle, an interference of radio waves received through a plurality of paths of the radio wave transmitted from the relevant vehicle, which are formed with reflection by a road surface and/or sidewall, including the shortest one directly reflected from another vehicle. In that case, the erroneous detection can also be avoided through a similar process based the decision by majority.

Further, in the case of employing a 2-frequency CW radar, the determination regarding the erroneous detection can be performed by comparing spectrum waveforms of received signals of two frequencies.

In the event that an interference occurs at plural center frequencies and it is difficult to obtain the position information, which is determined to be normal, after discarding the position information, which is determined to be abnormal, even with the use of any of the above-described methods for avoiding the erroneous detection, the fact that obstacle detection by the radar is disabled is informed to a driver using a display unit. The driver is thereby prompted to pay attention.

As a result, an automotive radio wave radar capable of avoiding erroneous detection caused by an interference can be realized without requiring a special circuit and a determining unit which are required in the related art, and hence without increasing the cost.

While the embodiments have been described above in connection with the case of using a 76-GHz band, it is a matter of course that similar advantages can also be obtained with the case of using another frequency band.

According to the automotive radio wave radar of the present invention, as will be understood from the above description, since normal data is obtained by executing decision by majority on the position information computed for at least three or more center frequencies, it is possible to avoid erroneous detection caused by jamming, including an interference, without requiring a special circuit and a determining unit and hence without increasing the cost.

What is claimed is:

1. An automotive radio wave radar in which a radio wave is radiated from a transmit antenna forward of a relevant vehicle, a reflected radio wave from a vehicle running ahead or other object is received by a receive antenna, and at least a position or a rate of the vehicle running ahead relative to the relevant vehicle is computed, said radar comprising:

oscillation device for oscillating a radio wave to be transmitted while changing a frequency of the transmitted radio wave at a certain time interval; and signal processing device for detecting an abnormality of a received signal based on signals obtained by receiving radio waves transmitted at different frequencies, wherein said radar is of the type radiating a radio wave modulated about a certain center frequency from said transmit antenna, said oscillation means oscillates the radio wave to be transmitted while changing a center frequency of the transmitted radio wave to different frequencies at a certain time interval; and signal processing means computes position information of the vehicle running ahead for each of the center frequencies of the radio waves transmitted from said oscillation means.

2. An automotive radio wave radar according to claim 1, wherein said signal processing means executes decision by majority on the position information computed for at least three or more center frequencies, and when mismatching position information is computed with the occurrence of any jamming, determines the position information, which has been decided to be minority with the decision by majority, to be an abnormal value and discards the abnormal value.

3. An automotive radio wave radar according to claim 1, further comprising means for informing a driver of the fact that obstacle detection by said radar is disabled, when an interference occurs for plural center frequencies and received signals are all determined to be abnormal.

4. An automotive radio wave radar according to claim 3, further comprising a display unit for providing visual display and/or a speaker for issuing a voice output to prompt the driver to pay attention.

5. An automotive radio wave radar in which a radio wave is radiated from a transmit antenna forward of a relevant vehicle, a reflected radio wave from a vehicle running ahead or other object is received by a receive antenna, and at least a position or a rate of the vehicle running ahead relative to the relevant vehicle is computed, said radar comprising:

oscillation device for oscillating a radio wave to be transmitted while changing a frequency of the transmitted radio wave at a certain time interval; and signal processing device for detecting an abnormality of a received signal based on signals obtained by receiving radio waves transmitted at different frequencies, wherein said radar is of the type radiating a radio wave modulated about a certain center frequency from said transmit antenna, said oscillation means oscillates the radio wave to be transmitted while changing a center frequency of the transmitted radio wave to different frequencies at a certain time interval; and signal processing means computes spectra from intermediate frequency signals resulting from down-converting received reflected radio waves of at least three or more center frequencies by a mixer, and when a part or the whole of at least one of the computed spectra is determined to have a different waveform with the occurrence of any jamming, determines the at least one spectrum to be abnormal and discards the abnormal spectrum.

6. An automotive radio wave radar in which a radio wave is radiated from a transmit antenna forward of a relevant vehicle, a reflected radio wave from a vehicle running ahead or other object is received by a receive antenna, and at least a position or a rate of the vehicle running ahead relative to the relevant vehicle is computed, said radar comprising:

oscillation device for oscillating a radio wave to be transmitted while changing a frequency of the transmitted radio wave at a certain time interval; and signal processing device for detecting an abnormality of a received signal based on signals obtained by receiving radio waves transmitted at different frequencies, wherein said radar is a 2-frequency CW (Continuous Wave) radar in which radio waves of two different frequencies are alternately radiated forward of the relevant vehicle, reflected radio waves from the vehicle running ahead are received by said receive antenna, and information of a range relative to the vehicle running ahead is computed from a phase difference between the received radio waves of the two frequencies.

7. An automotive radio wave radar in which a radio wave is radiated from a transmit antenna forward of a relevant vehicle, a reflected radio wave from a vehicle running ahead or other object is received by a receive antenna, and at least a position or a rate of the vehicle running ahead relative to the relevant vehicle is computed, said radar comprising:

oscillation device for oscillating a radio wave to be transmitted while changing a frequency of the transmitted radio wave at a certain time interval; and signal processing device for detecting an abnormality of a received signal based on signals obtained by receiving radio waves transmitted at different frequencies, wherein said radar is a 2-frequency CW (Continuous Wave) automotive radio wave radar in which radio waves of two different frequencies are alternately radiated forward of the relevant vehicle, reflected radio waves from the vehicle running ahead are received by said receive antenna, and information of a range relative to the vehicle running ahead is computed from a phase difference between the received radio waves of the two frequencies, and said radar includes signal processing means for computing spectra of the radio waves of the two frequencies received by said radar, and when a part or the whole of at least one of the computed spectra is determined to have a different waveform with the occurrence of any jamming, determining the at least one spectrum to be abnormal.

8. A signal processing method for use in an automotive radio wave radar, comprising the steps of radiating a radio wave from a transmit antenna forward of a relevant vehicle, receiving a reflected radio wave from a vehicle running ahead or other object by a receive antenna, and computing a position or a rate of at least the vehicle running ahead relative to the relevant vehicle, wherein said method further comprises the steps of:

oscillating a radio wave to be transmitted while changing a frequency of the transmitted radio wave at a certain time interval;

detecting an abnormality of a received signal based on signals obtained by receiving radio waves transmitted at different frequencies;

radiating a radio wave modulated about a certain center frequency from said transmit antenna forward of the relevant vehicle while changing the center frequency to different frequencies at a certain time interval;

computing position information of the vehicle running ahead for each of the center frequencies of the transmitted radio waves;

executing decision by majority on the position information computed for at least three or more center frequencies; and when mismatching position information is computed with the occurrence of any jamming, determining the position information, which has been decided to be minority with the decision by majority, to be an abnormal value and discarding the abnormal value.

9. A signal processing method for use in an automotive radio wave radar, comprising the steps of radiating a radio wave from a transmit antenna forward of a relevant vehicle, receiving a reflected radio wave from a vehicle running ahead or other object by a receive antenna, and computing a position or a rate of at least the vehicle running ahead relative to the relevant vehicle, wherein said method further comprises the steps of:

oscillating a radio wave to be transmitted while changing a frequency of the transmitted radio wave at a certain time interval;

detecting an abnormality of a received signal based on signals obtained by receiving radio waves transmitted at different frequencies;

radiating a radio wave modulated about a certain center frequency from said transmit antenna forward of the relevant vehicle while changing the center frequency to different frequencies at a certain time interval;

computing spectra from intermediate frequency signals resulting from down-converting received reflected radio waves by a mixer; and when a part or the whole of at least one of the computed spectra is determined to have a different waveform with the occurrence of any jamming, determining the at least one spectrum to be abnormal and discarding the abnormal spectrum.

10. A signal processing method for use in an automotive radio wave radar, comprising the steps of radiating a radio wave from a transmit antenna forward of a relevant vehicle, receiving a reflected radio wave from a vehicle running ahead or other object by a receive antenna, and computing a position or a rate of at least the vehicle running ahead relative to the relevant vehicle, wherein said method further comprises the steps of:

oscillating a radio wave to be transmitted while changing a frequency of the transmitted radio wave at a certain time interval;

detecting an abnormality of a received signal based on signals obtained by receiving radio waves transmitted at different frequencies;

alternately radiating radio waves of two different frequencies forward of the relevant vehicle;

receiving reflected radio waves from the vehicle running ahead by said receive antenna; and computing information of a range relative to the vehicle running ahead from a phase difference between the received radio waves of the two frequencies, wherein the method further comprises the steps of:

computing spectra of the radio waves of the two frequencies received by said radar; and when a part or the whole of at least one of the computed spectra is determined to have a different waveform with the occurrence of any jamming, determining the at least one spectrum to be abnormal.

11. An automotive radio wave radar in which a radio wave is radiated from a transmit antenna forward of a relevant vehicle, a reflected radio wave from a vehicle running ahead or other object is received by a receive antenna, and at least a position or a rate of the vehicle running ahead relative to the relevant vehicle is computed, said radar comprising:

oscillation device for oscillating a radio wave to be transmitted while performing frequency modulation to change a frequency of the transmitted radio wave in a predetermined pattern with time in order to generate FMCW (Frequency Modulated Continuous Waves); and signal processing device for detecting an abnormality of a received signal based on signals obtained by receiving radio waves transmitted at said predetermined pattern with time.

* * * * *